(12) United States Patent
Drost et al.

(10) Patent No.: US 7,220,078 B2
(45) Date of Patent: May 22, 2007

(54) GROUND COVERING ELEMENTS OF ARTIFICIAL STONE MATERIAL

(75) Inventors: Andreas Drost, Karlsruhe (DE); Michael Schmitz, Rheinmünster (DE)

(73) Assignee: F.von Langsdorff Licensing Limited, Inglewood, Ontario (CA)

( * ) Notice: Subject to any disclaimer, the term of this patent is extended or adjusted under 35 U.S.C. 154(b) by 0 days.

(21) Appl. No.: 11/188,784

(22) Filed: Jul. 26, 2005

(65) Prior Publication Data

US 2005/0254894 A1   Nov. 17, 2005

Related U.S. Application Data

(60) Division of application No. 10/633,663, filed on Aug. 5, 2003, now Pat. No. 6,942,420, which is a continuation of application No. PCT/EP01/11151, filed on Sep. 26, 2001.

(30) Foreign Application Priority Data

Feb. 5, 2001   (DE) ............................... 101 05 055

(51) Int. Cl.
*E04B 5/08* (2006.01)
(52) U.S. Cl. ..................... 404/38; 404/34; 404/37; 404/41; 52/603; 52/604; 52/605
(58) Field of Classification Search ............... 52/598, 52/603, 604, 605, 610; 404/34, 37, 38, 41; D25/113
See application file for complete search history.

(56) References Cited

U.S. PATENT DOCUMENTS

| 195,286 | A |   | 9/1877 | Ingalls |   |
|---|---|---|---|---|---|
| 803,380 | A |   | 10/1905 | Wickre |   |
| 1,058,674 | A |   | 4/1913 | Kertes |   |
| 1,884,216 | A |   | 10/1932 | Purdy |   |
| 2,060,746 | A |   | 11/1936 | Porter |   |
| 2,114,244 | A |   | 4/1938 | Zoettl |   |
| 3,903,702 | A |   | 9/1975 | Appleton |   |
| 4,354,773 | A | * | 10/1982 | Noack | ........................ 404/41 |
| 4,773,790 | A |   | 9/1988 | Hagenah |   |
| 5,224,792 | A |   | 7/1993 | Hagenah |   |
| 5,251,997 | A |   | 10/1993 | Brock |   |
| 5,342,142 | A |   | 8/1994 | Barth et al. |   |
| 5,409,325 | A |   | 4/1995 | Wu |   |
| 5,466,089 | A |   | 11/1995 | Jurik |   |
| 5,496,129 | A |   | 3/1996 | Dude |   |
| 5,503,498 | A |   | 4/1996 | Scheiwiller |   |
| D389,926 | S |   | 1/1998 | Barth et al. |   |

(Continued)

FOREIGN PATENT DOCUMENTS

DE       295 10 837 U1    10/1995

(Continued)

*Primary Examiner*—Gary S. Hartmann
(74) *Attorney, Agent, or Firm*—Cahn & Samuels, LLP

(57) ABSTRACT

The invention relates to an artificial stone floor element with a basic shape that corresponds to the combination of a plurality of square basic elements, especially to an angular floor element. The floor element includes projections and recesses along its peripheral sides of the basic element when seen from the centre of the respective top face of the basic element is substantially point-symmetric with respect to its mid-point. The floor element in further embodiments includes a profile that consists of three projections and three recesses.

11 Claims, 8 Drawing Sheets

U.S. PATENT DOCUMENTS

| | | |
|---|---|---|
| 5,797,698 A | 8/1998 | Barth et al. |
| D397,802 S * | 9/1998 | Terry .......................... D25/113 |
| 5,884,445 A * | 3/1999 | Woolford ................... 52/311.2 |
| 5,902,069 A | 5/1999 | Barth et al. |
| 5,921,705 A | 7/1999 | Hodson et al. |
| D425,628 S | 5/2000 | Barth et al. |
| 6,055,784 A | 5/2000 | Geiger |
| D426,317 S | 6/2000 | Fifield |
| D431,305 S * | 9/2000 | Barth et al. ................ D25/113 |
| D431,871 S * | 10/2000 | Abbrancati ............... D25/113 |
| 6,340,267 B1 | 1/2002 | Kortmann |
| 6,508,607 B1 | 1/2003 | Smith et al. |
| D485,370 S | 1/2004 | Schmitz |
| D498,543 S * | 11/2004 | Schmitz et al. ............ D25/113 |
| 6,942,420 B1 * | 9/2005 | Drost et al. .................. 404/38 |
| 2003/0121229 A1 | 7/2003 | Schmitz |

FOREIGN PATENT DOCUMENTS

| | | |
|---|---|---|
| DE | 197 33 741 A1 | 5/1998 |
| DE | 100 13 613 A1 | 10/2001 |
| EP | 1 024 226 A1 | 12/1998 |
| EP | 0 930 399 A2 | 1/1999 |
| EP | 0 927 792 A2 | 7/1999 |
| EP | 1 162 313 A1 | 12/2001 |
| WO | WO9528523 | 10/1995 |
| WO | WO 97/38168 | 10/1997 |
| WO | WO 00/14335 A1 | 3/2000 |
| WO | WO 01/59217 A1 | 8/2001 |
| WO | WO 01/94703 A1 | 12/2001 |

* cited by examiner

GROUND COVERING ELEMENTS OF ARTIFICIAL STONE MATERIAL

This application is a Divisional of U.S. patent application Ser. No. 10/633,663 filed on Aug. 5, 2003, which is a continuation of PCT Application Number PCT/EP01/11151 filed on Sep. 26, 2001, which claims priority from German application number 101 05 055.0 filed on Feb. 5, 2001; which are all incorporated by reference.

BACKGROUND OF THE INVENTION

1. Field of the Invention

The invention relates, according to a first aspect, to a ground covering element of artificial stone material, having a basic shape corresponding to a unification of several square basic elements, in particular an angular ground covering element, the ground covering element comprising projections and recesses all around its circumference, all circumferential basic element sides—as seen from the center of the respective basic element upper side—having substantially the same profile which is substantially point-symmetric with respect its halving point.

2. Description of the Prior Art

Basic elements of this kind, also angular ground covering elements, are known. So far, the design of the profile has been based more or less on intuition.

It is an object of the invention to purposefully design the profile in order to obtain a good compromise between inter-engagement effect in case of not completely perfect mutual orientation of adjacent ground covering elements and strength of the inter-engagement between adjacent ground covering elements.

SUMMARY OF THE INVENTION

To meet this object, the aforementioned ground covering element is characterized in that this profile consists of three projections and three recesses. It will be elucidated in more detail further below that this number will result in an optimum compromise in the sense of the underlying object mentioned.

The afore-mentioned "artificial stone material" in most cases is concrete. As a further preferred possibility, brick-like materials should be mentioned. In general, there are also all materials conceivable having embedded therein additives or fillers in binders (e.g. also plastics) hardening as a function of time, in particular polymer concrete. The word "substantially" was used with consideration, since in most cases, the profile is not equal on all circumferential basic element sides in the strict sense and since the point symmetry is not realized in the strict sense in most cases. Ground covering elements of artificial stone material are manufactured with such large manufacturing tolerances that this is of itself sufficient to prevent the manufacture of exactly identical profiles and exact point symmetry. In addition thereto, it happens quite often that minor changes in dimension are purposefully made on specific locations of the ground covering element, e.g. for taking into account e.g. a slanted corner or a retraction of a circumferential portion in order to create free space for a laying gap, so that the term "substantially" makes sense under this aspect. Finally, it may be reasonable to make e.g. the projections slightly narrower (as measured in the direction of extension of the basic element side) than the recesses, which are complementary in engagement, in order to thus provide a laying gap between adjacently laid ground covering elements. Quite analogous aspects are applicable as regards the use of the term "substantially" in the following description and in the entirety of the claims.

One could also say, in other words, that the profiles at the circumferential basic element sides of the ground covering element are designed such that a particular profile considered may be placed adjacent a substantially identical profile after rotation by 180° so as to provide complementary inter-engagement.

The claims as well as the description of the present patent specification, at numerous locations thereof, make statements on geometric relationships, e.g. "square basic element", "angular ground covering element", "projection", "recess", "profile", "wide", "trapezoidal". All of these statements relate to a representation of the ground covering element in a plan view, i.e. a view from above onto the useful or upper side of the respective ground covering element, as if the same were laid on a base, unless otherwise expressly stated at the particular location. The ground covering element according to the invention preferably is a ground covering element provided to make ground coverings for "outdoor use" or for laying areas in the outside. A particularly preferred field of use of the ground covering element according to the invention is for traffic areas, in particular such areas outdoors, e.g. areas for motor vehicle traffic, areas for bicycle traffic, areas for pedestrian traffic. Particularly typical and preferred are squares, yards, drives, paths, roads, pedestrian areas, loading areas, terraces, parking areas for vehicles, filling stations, commercial traffic areas, industrial traffic areas, factory yards, container sites.

Preferably, the projections and recesses are trapezoidal, which can be manufactured easily and is favorable for the shear strength of the projections. As an alternative it is preferred that the projections and recesses are confined each by a line rounded at least in part, e.g. semi-circular with rounded transition to the left and to the right. It is to be noted generally that the geometric design of the projections and recesses offers a large variety of possibilities.

Preferably, the middle projection and the middle recess each are considerably wider than the other projections and recesses, respectively. In this regard, at least 1.5 times as wide is particularly preferred, at least 1.8 times as wide is still further preferred, and at least 2.0 times as wide is even further preferred. It will become clearer by more detailed statements further below why this difference in dimensions will result in a still further improved compromise in the sense of the solution of the object.

Preferably, the ground covering element is provided with spacer projections on its circumference, with these spacer projections being left disregarded in the consideration of the geometric relationships discussed in the claims. However, it is pointed out that there are also designs in which the geometric relationships mentioned in the claims are maintained despite the spacer projections. Due to the spacer projections, ground covering elements are obtained that can be laid in particularly expedient manner with the laying gap width remaining the same (as measured transversely of the general direction of extension of the circumferential basic element side).

According to a second aspect, the invention relates to a ground covering element of artificial stone material, having a basic shape corresponding to a unification of several square basic elements, in particular an angular ground covering element, the ground covering element comprising projections and recesses all around the circumference and comprising retractions on the circumference which result in efficient water passage openings in a group of the adjacently laid ground covering elements, characterized in that the projections and recesses in their entirety are defined by one profile each for each circumferential basic element side, there being provided (a) on zero to all circumferential basic element sides, substantially a first profile each, having—as seen from the center of the particular basic element upper side—a first end neighboring projection, a second end neighboring projection and an end distance projection there-between;

(b) on zero to part of the circumferential basic element sides, substantially a second profile each, having—as seen from the of the particular basic element upper side—a first end neighboring projection and a second end neighboring projection;

(c) and on zero to part of the circumferential basic element sides, substantially a third profile each, having—as seen from the center of the particular basic element upper side—an end distance projection and an end neighboring projection;

(d) wherein, for laying a group of the ground covering elements adjacent each other, a first profile, if provided, can be applied to a first profile, if provided, of a neighboring ground covering element; or can be applied to a second profile, if provided, of a neighboring ground covering element; or can be applied to a third profile, if provided, of a neighboring ground covering element;

a second profile, if provided, can be applied to a second profile, if provided, of a neighboring ground covering element; or can be applied to a third profile, if provided, of a neighboring ground covering element, and a third profile, if provided, can be applied to a third profile, if provided, of a neighboring ground covering element.

Ground covering elements of this type according to the invention, in the state laid adjacent each other, thus lead to ground coverings in which efficient water passage openings are present in a very considerable part of the ground covering element circumferences. However, due to this, the ground covering elements mostly lose the feature "the profile is substantially point-symmetric with respect to its halving point".

All statements made so far in the description, of course with the exception of statements that are contradictory to the second aspect of the invention, apply analogously also for ground covering elements according to the second aspect of the invention, inclusive of the preferred developments thereof.

It is emphasized that the terms "first end neighboring projection" and "second end neighboring projection" do not mean that the projection concerned begins immediately at an end of the respective circumferential basic element side. There may be a distance provided. Rather, what is to be expressed is that the respective projection is positioned not very far from the respective end and in particular that there is no additional projection present between the end neighboring projection and the end proper. The first end does not necessarily have to be the left-hand end of a particular profile, but may optionally be the left-hand end or the right-hand end of the particular profile.

As in case of the ground covering element according to the first aspect of the invention, the projections and recesses preferably are trapezoidal, and as an alternative are preferably confined by a line that is rounded at least in part. The statements made further above are applicable here as well.

Preferably, the retractions are trapezoidal, as an alternative preferably confined at least in part by a rounded line. The statements made hereinbefore in connection with the shape of the projections and recesses apply analogously for the retractions as well.

The embodiments described herein provide further details of the first, second and third profiles.

With respect to the first profile and/or the second profile and/or the third profile, the retraction in each thereof is preferably at least 33% of the width of the respective circumferential basic element side, more preferably at least 40% of the width, still more preferably at least 50% of the width. In the second profile, it is easier to obtain a maximum possible width of the retraction than in case of the first and third profiles.

Preferably, the particular retraction at least in part is retracted or taken back further towards the interior of the ground covering element than the recesses or recesses of the particular basic element side. The wider the respective retraction and the "deeper" the retraction is taken back, the higher the percentage of the sum of the cross-sectional areas of the water penetration passages in relation to the size of the covering in total.

The present disclosure further defines preferred combinations of first profiles, second profiles and third profiles on the circumference of the ground covering element. More detailed information in this regard will be given by the embodiments further below.

As regards the ground covering element according to the first aspect of the invention, it is indeed preferred that the first projection, the first recess, the third projection and the third recess all have substantially the same width (as measured in the direction of the circumferential basic element side). However, it is possible as well to provide just the first projection and the third recess with substantially the same width and to provide just the first recess and the third projection with substantially the same width (which, however, is narrower or wider than the width of the aforementioned "pair").

As with the ground covering element according to the first aspect of the invention, the ground covering element according to the second aspect of the invention preferably may have spacer projections and/or at least one dummy gap.

According to a third aspect, the invention relates to a set of ground covering elements, containing a ground covering element according to the first aspect of the invention (first ground covering element) and a ground covering element according to the second aspect of the invention (second ground covering element) wherein, for laying a first ground covering element and a second ground covering element adjacent each other, the basic side profile of the first ground covering element can be laid adjacent a first profile or a second profile or a third profile of an adjacent second ground covering element.

The invention thus provides a set of ground covering elements, in which first ground covering elements and second ground covering elements can be laid adjacent each other in an arbitrary mutual orientation. This property comes to bear in particularly advantageous manner either at the boundary between a first part of a covering laid with first ground covering elements and a second part of the covering laid with second ground covering elements or—which is possible without any problem—in a covering with a regular alternation between a first ground covering element and a second ground covering element.

BRIEF DESCRIPTION OF THE DRAWINGS

The invention and preferred developments of the invention will be described in more detail hereinafter by way of embodiments shown in the drawings in which.

DESCRIPTION OF THE PREFERRED EMBODIMENTS

Figure 1:
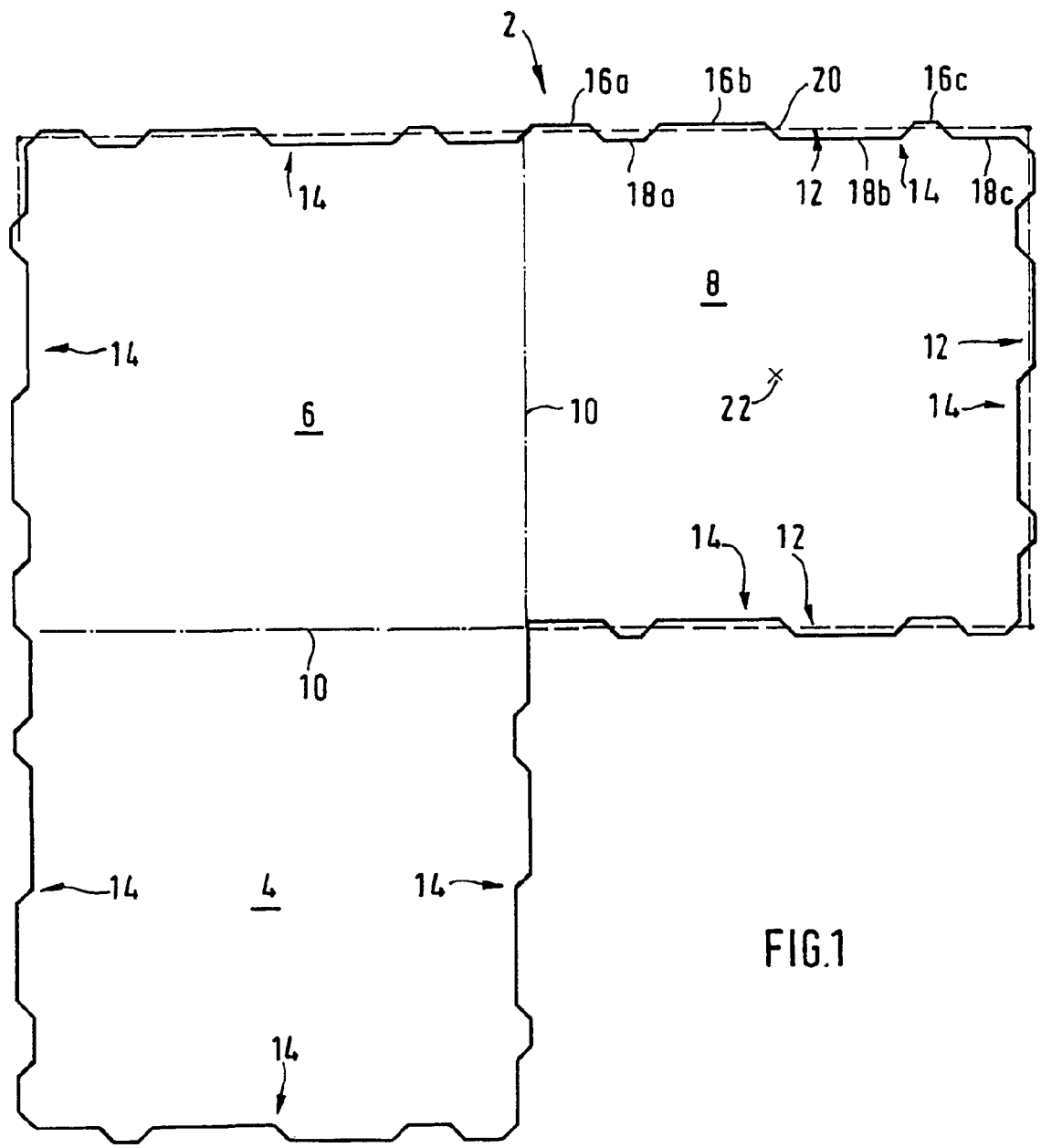
FIG. 1 shows an angular ground covering element.

All of the drawing figures are plan views.

FIG. 1 shows an angular ground covering element 2. In the following, the term "covering element" will be used throughout in the following instead of "ground covering element" for reasons of brevity. All covering elements shown preferably consist of concrete.

The configuration of the covering element 2 is conceivable easiest if one first speaks of a "basic shape". In case of the covering element 2 of FIG. 1, this basic shape is constituted by the unification of three square basic elements 4, 6, 8. The junction lines 10 of the three basic elements 4, 6, 8 are illustrated in broken lines 10. Basic element 4 thus has three circumferential basic element sides 12, basic element 6 has two circumferential basic element sides 12, and basic element 8 has three circumferential basic element sides 12. In basic element 8, the three circumferential basic element sides 12 are illustrated in broken lines. When looking at the combination of these three circumferential basic element sides and the junction line 10 belonging to basic element 8, the basic element square will become apparent immediately.

Basic element 8 shall be considered in more detail in the following:

On each of the three circumferential basic element sides 12, there is provided a profile 14 composed of projections 16 and recesses 18. The respective circumferential basic element side 12 at the same time represents a neutral line with respect to which the projections 16 are projecting outwardly and with respect to which the recesses 18 are receding inwardly.

To begin with, the in FIG. 1 upper, in total horizontally extending profile 14 of basic element 8 shall be considered. Starting from the left-hand end of the basis element side 12 considered, the profile 14 begins with a projection 16a, followed by a recess 18a, then a projection 16b, thereafter a recess 18b, then a projection 16c and thereafter a recess 18c extending up to the right-hand end of basic element side 12.

All projections 16a to c and all recesses 18a to c are of trapezoidal shape, i.e. they begin with a slightly wider base on the straight basic element side 12 and taper towards the free end and towards the base, respectively. The projections 16 and recesses 18 follow each other without a gap. The projections 16a and 16c closer to the ends of basic element side 12 (in other embodiments described hereinafter, reference will be made to "end neighboring projection") and the recesses 18a and 18c closer to the ends of basic element side 12 all have substantially the same mutual width (measured on the basic element side 12=neutral line). The projection 16b remoter from the ends of basic element side 12 as well as the recess 18b remoter from the ends of basic element side 12 have the same mutual width and each are about twice as wide as any of the projections 16a and 16c and any of the recesses 18a and 18c, respectively. The terms "substantially" and "about" have been used purposefully, since—for reasons to be elucidated in more detail further below—the measurement relationships mentioned are not to be understood as being exactly so. For example, projection 16a indeed is somewhat wider than projection 16c. On the other hand, recess 18c indeed is somewhat wider than recess 18a; moreover, the corner of covering element 2 is slanted with a small taper at the right-hand end of recess 18c. Finally, it is pointed out that in case of concrete products, like the covering element 2 illustrated, indications of measurements and measurement relationships are not to be understood as being exact anyway due to the tolerances of the manufacturing mold and due to the material providing no particularly smooth areas. A particularly relevant aspect resulting in a variation in width among projections 16 and recesses 18 is the fact that on the circumferential sides of covering element 2, where a neighboring covering element is adjoining when several covering elements 2 are laid adjacent each other, a laying gap e.g. of a width of 3 to 5 mm is maintained, whereas there is no laying gap on junction line 10. To provide for certain compensation in this respect, the more or less mathematical initial design of the profile 14 with respect to the width of the projections 16 and the recesses 18 and with respect to the positioning of the projections 16 and recesses 18 is slightly modified.

The profile 14 in consideration is substantially point-symmetric with respect to its halving point 20, i.e. when the left-hand profile half is rotated by 180° in the drawing plane of FIG. 1, it is identical with the right-hand profile half. The term "substantially" was inserted for the reasons analogous to those set forth hereinbefore.

It is emphasized that the profile 14 described could also be formed "inversely", i.e. folded by 180° about a halving line located in the drawing plane, i.e. left-hand end and right-hand end are interchanged. Profile 14 then would begin with a first recess on the left-hand side.

The afore-mentioned widths of the projections 16 and recesses 18 are measured on the neutral line 12. This is as a rule the most appropriate place of the covering element 2 according to the invention.

It is pointed out that the trapezoidal shape of the projections 16 and recesses 18 constitutes just one of numerous embodiments possible. Instead of this, one could choose e.g. a rectangular shape (which however is more difficult to produce) or a farther projecting or farther receding shape e.g. in the form of a low triangle. The profile 14, as seen from the center 22 of the particular basic element, is the same on each of the three circumferential basic element sides 12, i.e. when the upper profile 14 considered first is rotated clockwise by 90° about the center 22, it merges substantially with the in FIG. 1 right-hand profile 14 extending in its entirety in vertical direction, and when the upper profile 14 is rotated by 180° about the center 22, it merges substantially with the in FIG. 1 lower profile 14 of the particular basic element 8, extending in its entirety in horizontal direction. As regards the use of the term "substantially", it is referred to the statements made hereinbefore. Due to the afore-mentioned point symmetry of each profile 14 with regard to the halving point 20, the lower profile 14 is substantially a parallel shift of the upper profile 14.

All statements made hereinbefore with respect to the profiles 14 apply analogously to the basic elements 4 and 6, with the basic element 6 of course having only two circumferential basic element sides and thus only two profiles 14 extending so to speak perpendicularly with respect to each other.

The geometry of the profiles 14 described allows adjacent covering elements to be placed adjacent the covering element 2 illustrated in FIG. 1, either in the same orientation or in an orientation rotated by 90° (clockwise or anticlockwise) or an orientation rotated by 180°. The profiles 14 of adjacent covering elements 2 always fit together in complementary manner (with some "air" there-between); there is mutual engagement or anchoring of the adjacent covering elements 2 in addition to the mutual anchoring of adjacent covering elements in the laid state that is obtained by the angular configuration of the covering element 2 illustrated.

It is pointed out that covering elements 2 according to the invention indeed are supposed to have a basic shape corresponding to a unification of several square basic elements, but that the number of the basic elements and the orientation of the unification can be chosen. For example, it would be possible to unify e.g. three basic elements 4, 6, 8 (or also two basic elements or four basic elements) in a straight series, or to provide an L-shaped covering element 2 by addition of a further basic element on the right-hand side of basic element 8, or to provide a T-shaped covering element 2 by addition of a further basic element to the upper side of the middle basic element 6, or to provide a cruciform covering element 2 by addition of a further basic element to the upper side of the middle basic element 6 and addition of a further basic element to the left-hand side of the middle basic element 6, etc.

It is expressly emphasized that the invention, as an alternative, also provides a ground covering element whose basic shape consists of one square basic element only, but otherwise has the cogent features described in the present patent specification and optionally further preferred features.

Figure 2A:
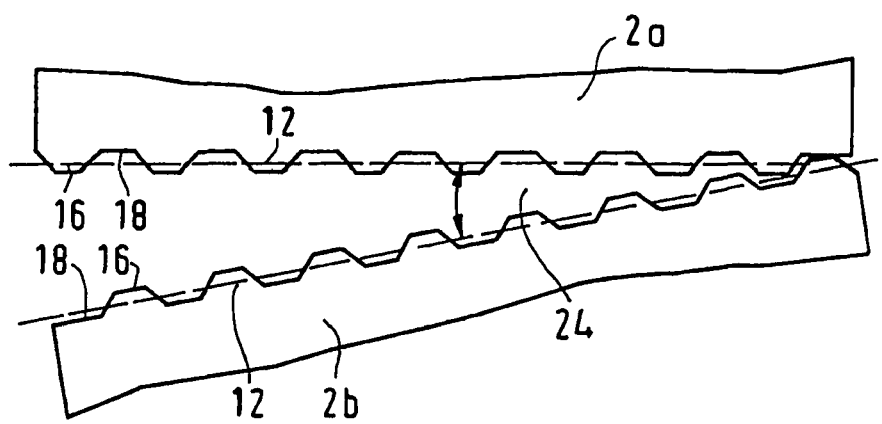
FIG. 2a to 2d each show the abutment portion of two adjacent ground covering elements in a fragmentary view.
Figure 2B:
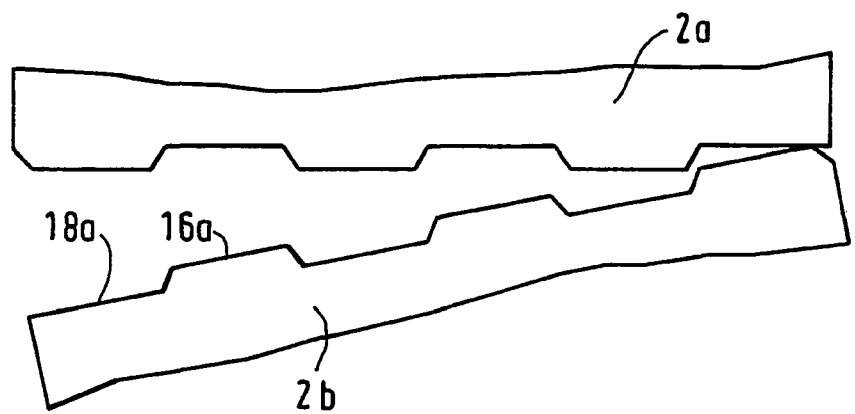
Figure 2C:
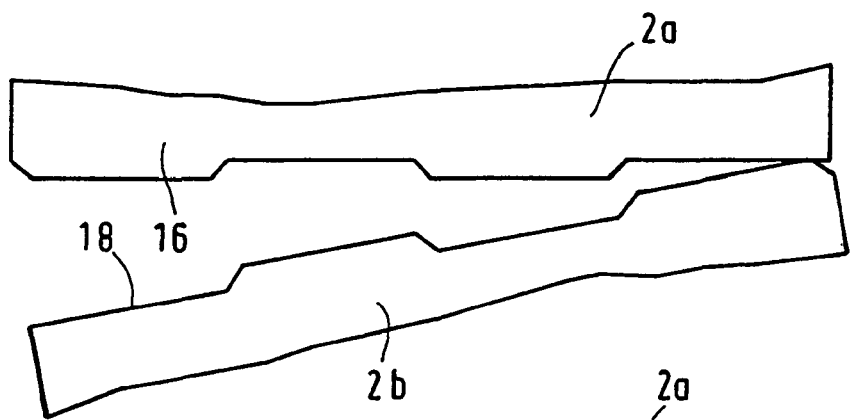

It is illustrated by way of FIGS. 2a to d why the number of "three projections" and "three recesses" according to the invention provides for especially good results. Each of the partial figures a to d schematically illustrates a profile 14 of a circumferential basic element side 12. In FIG. 2a, the basic element side is divided into eight projections 16 and eight recesses 18 which all have the same mutual width. In partial FIG. 2b, the basic element side is divided into three projections 16 and three recesses 18 which all have the same mutual width. In partial FIG. 2c, the basic element side is divided into two projections 16 and two recesses 18 which all have the same mutual width. The alternative with just one projection and one recess is not illustrated as it results in incomplete inter-engagement between two covering elements.

Each of the basic element sides 12 of the two adjacent covering elements 2a and 2b do not extend parallel to each other (as desired for perfect laying), but extend at an angle 24 with respect to each other, with angle 24 being the same in all partial FIGS. 2a to d.

If two adjacent covering elements 2a and 2b are arranged beside each other with a misalignment in the sense of the angle 24 mentioned, which may occur due to inaccurate laying work or by displacement of individual covering elements 2 by traffic loads in the laid state, FIG. 2a still maintains a residual inter-engagement by the last projection 16 at the right-hand end of basic element side 12 of the one covering element 2a and a recess 18 at the corresponding end of the basic element side 12 of the other covering element 2b. In case of the covering elements 2a and 2b of FIG. 2b, the left hand trapezoidal side of the rightmost projection 16c of covering element 2a and the left-hand trapezoidal side of the rightmost recess 18c of covering element 2b have migrated a certain distance to the left, but in this situation there is just left a residual inter-engagement between this projection 16c and this recess 18c (although with lesser depth of positive engagement). In case of the covering elements 2a and 2b according to FIG. 2c, there is no residual inter-engagement left in this situation. The conclusion to be drawn therefrom is that the residual inter-engagement effect in case of angular misalignment between adjacent covering elements is the better the larger the number of projections and recesses over a given length of a basic element side.

A further aspect is the strength or load-bearing capacity of the inter-engagement between two adjacently laid covering elements 2a and 2b in the correctly laid state, i.e. with mutually parallel basic element sides 12 with so little spacing from each other as corresponds to the usual laying gap. In this respect, the shear strength, i.e. the covering elements 2a and 2b have forces of opposite directions applied thereto in the direction parallel to the basic element sides 12, decreases with increasing number of projections 16 and recesses 18 on a given length of the basic element side 12. On the one hand, the overall shear area summed up from the individual projections 16 becomes ever smaller with increasing number of projections (since the laying gap sections between the oblique trapezoidal sides do not contribute in the overall shear area and since a loss in overall shear area is caused in that, on a larger number of projections, the cross-sectional area of shear is not located in the root of the projection, but in the projection portion that is tapered in comparison therewith). On the other hand, there is the effect that, with a larger number of projections, it is by far not the entire number of projections that provides a supporting effect against shearing, but less than half thereof in accordance with experience. The aspect of shear strength thus speaks for making the number of projections and recesses as small as possible for a given length of the basic element side.

On consideration of these aspects, the inventors thus have arrived at the conclusion that the number of three projections and three recesses represents the optimum compromise between residual inter-engagement effect in case of angular misalignment and high shear strength.

Figure 2D:
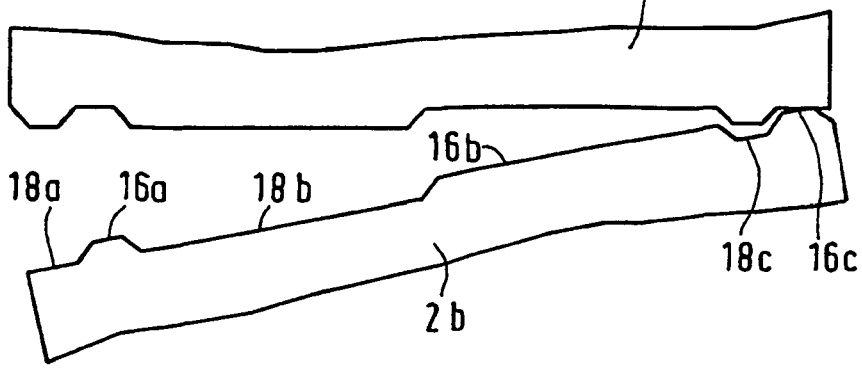

This compromise is still further enhanced when the pairs of projection 16a and recess 18a and projection 16c and recess 18c closer to the respective ends of the basic element side are of lesser width than the pair of projection 16b and recess 18b arranged there-between, cf. FIG. 2d.

Figure 3:
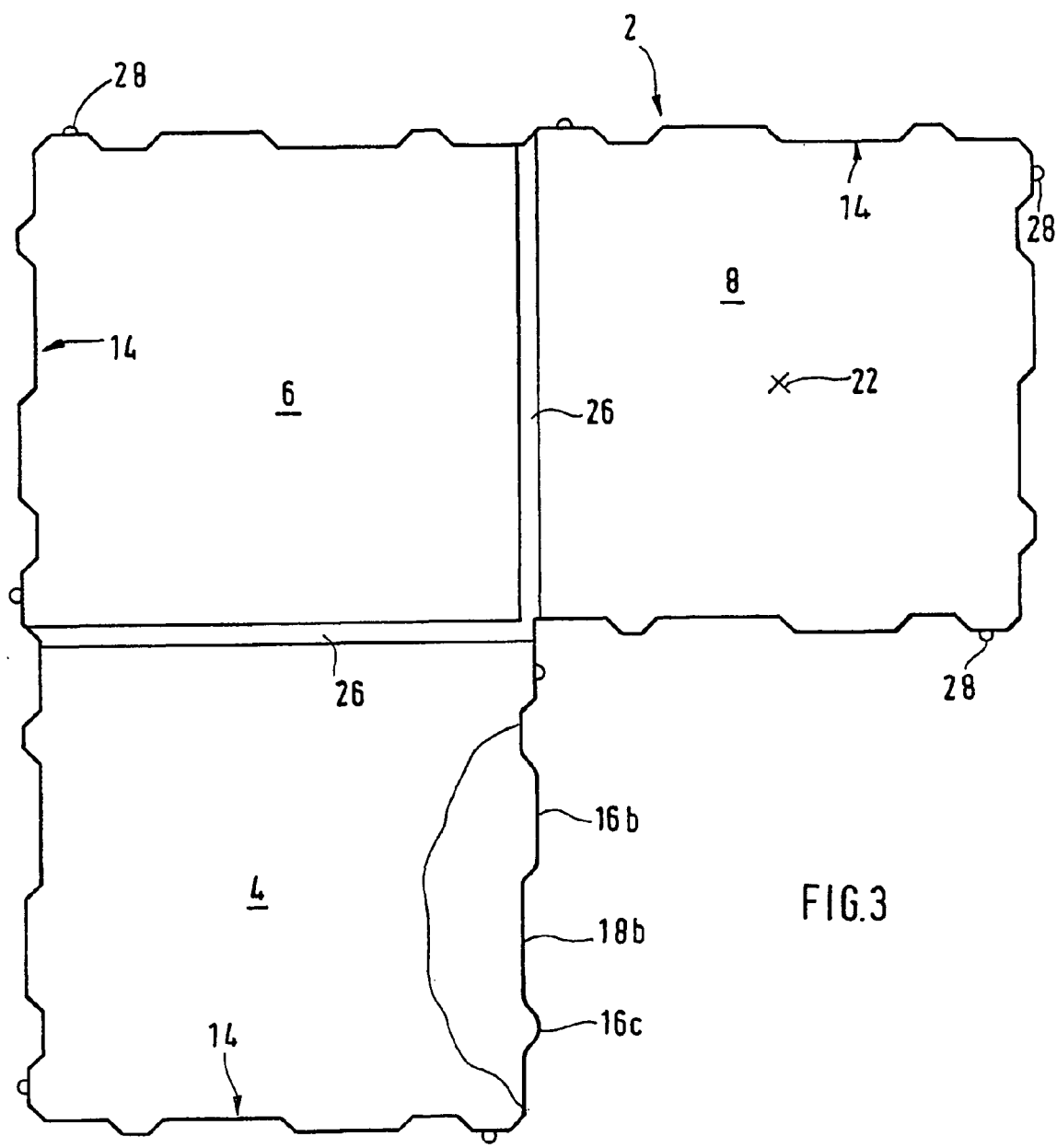
FIG. 3 shows a second embodiment of a ground covering element that is modified over that of FIG. 1, with partial regions being broken away.

The embodiment of a covering element 2 according to FIG. 3 differs from the embodiment according to FIG. 1 in that straight dummy gaps 26 extend at those locations where the junction lines 10 were illustrated in FIG. 1. Dummy gaps are gaps extending from the upper side downwardly into covering element 2 up to a specific depth of e.g. 5 mm only. The dummy gaps 26 provide for an optical subdivision of covering element 2 into three partial covering elements which, apart from the profiles 14, correspond to the three basic elements 4, 6, 8. As measured transversely of their direction of extension, the dummy gaps 26 have a width corresponding substantially to the height of the projections 16, as measured from the bottom of the recesses 18 and, in addition, the afore-mentioned laying gap width (the latter being measured transversely to the general direction of extension of profile 14). It is possible not only with the embodiment according to FIG. 3, but with all embodiments that the upper sides of the projections 16 are slightly lowered with respect to the remaining upper side of covering element 2, e.g. by 4 to 8 mm. The consequence hereof is that the inter-engagement between two adjacent profiles 14 is optically less apparent in the laid covering of several covering elements 2. The dummy gaps 26 so to speak represent an optical continuation of the groove formed by the two adjacent profiles 14 and the laying gap there-between.

Moreover, FIG. 3 illustrates the possibility of providing spacer projections 28 distributed over the circumference of the covering element 2. In the illustrated embodiment, the spacer projections 28 are of semi-circular cross-section each and are provided on the—as seen from the center 22 of the respective basic element upper side—leftmost projection 16 of the corresponding profile 14 each. In FIG. 3, the size of the spacer projections 28 is shown in enlarged form as compared to their natural size in order to make the spacer projections clearly visible at all. The spacer projections 28 facilitate laying of the covering elements 2, since the adjacent covering element 2 to be laid next can be placed simply in physical contact between the spacer projections 28 of the already laid covering element 2 and the spacer projections 28 of the new covering element 2 to be laid. In this manner, a laying gap of uniform width is created. It is emphasized that the spacer projections may be selectively of other cross-sectional geometry and be located on other locations than those shown in FIG. 3. It is preferred that the spacer projections begin only a certain distance below the covering element upper side and extend from there to the very bottom side of the covering element 2. The spacer projections 28 are formed integrally with the remainder of the covering element 2 of concrete.

FIG. 3 finally illustrates the possibility of confining the projections 16 and the recesses 18 by a rounded line each (rounded throughout or rounded in portions and straight in portions).

It is emphasized furthermore that the features "dummy gaps 26" and "spacer projections 28" need not necessarily be realized in combination, but that it is possible to provide covering elements 2 with at least one dummy gap 26 and/or with spacer projections 28. It is possible to provide just one dummy gap 26 or more than two dummy gaps 26, e.g. to optically subdivide the unification of the basic elements 6 and 8 into three parts by means of two dummy gaps 26. It is possible, furthermore, to provide one or more non-linear dummy gaps, extending e.g. in conformity with the path of profile 14.

Figure 4:
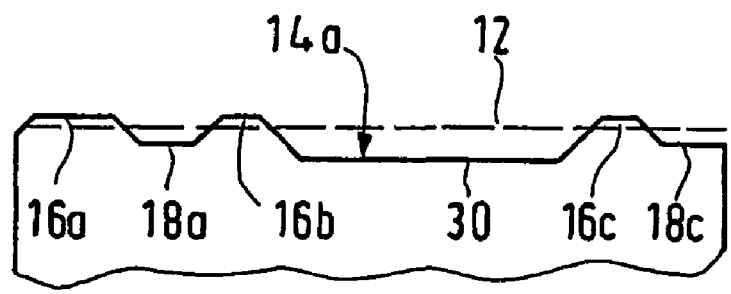
FIG. 4 shows a portion of a circumference of a ground covering element.
Figure 5:
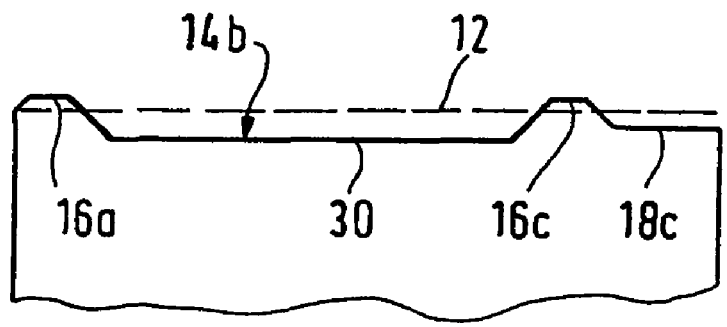
FIG. 5 shows a portion of a circumference of a ground covering element.
Figure 6:
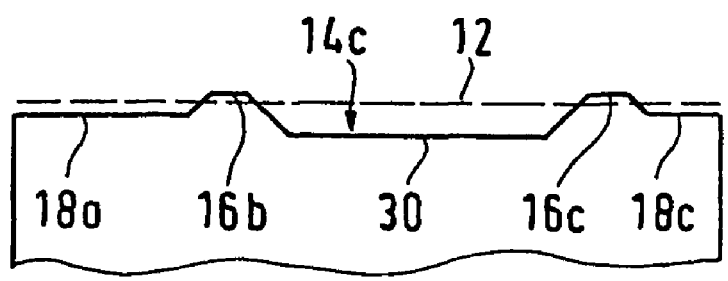
FIG. 6 shows a portion of a circumference of a ground covering element.

FIGS. 4 to 6 illustrate profiles 14a, 14b, 14c that are modified with respect to profile 14 of FIG. 1. Here too, the neutral line 12 is shown in each of the figures. The distance from the respective left-hand end to the respective right-hand end corresponds to that of a basic element side in FIG. 1.

The profile illustrated in FIG. 4 is a profile of the type referred to as "first profile 14a" in the present text. In comparison with the profile 14 of FIG. 1 (e.g., considering the "horizontal" profile 14 to the upper right in FIG. 1), the second projection 16b is rendered narrower to such an extent that it has a width (as measured in the direction of the neutral line 12) corresponding to the width of third projection 16c. Between the thus formed second projection 16b and the third projection 16c, there is located a retraction 30. Retraction 30 is further retracted towards the interior of covering element 2 than the bottom of recess 18a and the bottom of recess 18c. Retraction 30 in total is of trapezoidal shape. In the introductory part of the specification, first projection 16a is designated "first end neighboring projection" (as it is located in the neighborhood of the first end of the profile), second projection 16b is designated "end distance projection" (as, in comparison with the other projections, it is arranged at a larger distance from the ends of the profile), and third projection 16c is designated "second end neighboring projection" (as it is located in the neighborhood of another end of the profile).

The profile illustrated in FIG. 5 is a profile of the type referred to as "second profile 14b" in the present text. In comparison with the profile 14 of FIG. 1 (e.g. considering the "horizontal" profile 14 to the upper right in FIG. 1), the second projection is omitted completely so that of the projections only the first end neighboring projection 16a and the second end neighboring projection 16c are left. Between these projections 16a and 16b, there is located a retraction 30 (which thus replaces first recess 18a, second projection 16b and second recess 18b) which, as in case of FIG. 4, is retracted further towards the interior of covering element 2 than the bottom of recess 18c.

The profile illustrated in FIG. 6 is a profile of the type referred to as "third profile 14c" in the present text. In comparison with the profile 14 of FIG. 1 (e.g. considering the "horizontal" profile 14 to the upper right in FIG. 1), the first projection 16 is omitted and substituted by a corresponding broadening of the first recess 18a. The second projection 16b of FIG. 1 is rendered narrower to the same extent as in case of profile 14a in FIG. 4. The retraction 30 in FIG. 5 also corresponds to the retraction 30 in FIG. 4. In the description, projection 16b is designated "end distance projection" (since, in the light of the just outlined history of origin, it corresponds to the end distance projection 16b in FIG. 4 and although there is no further projection between it and the left-hand end of the profile 14c). It is emphasized that the profiles 14a, 14b, 14c as an alternative may also be designed such that they are folded by 180° about their halving axis located in the drawing plane, so that they would each begin with recess 18c at the left-hand end.

In the first profile 14a of FIG. 4, the projections 16a, 16b, 16c all have substantially the same width (as measured in the direction of the neutral line 12); the recesses 18a and 18c also have substantially the same mutual width and substantially the same width as the projections (as measured in the direction of neutral line 12). As regards the reasons for using the term "substantially", these have already been pointed out hereinbefore in connection with FIG. 1. In particular, one can see in FIG. 4 that the first end neighboring projection 16a in reality is somewhat wider than the projections 16b and 16c. It is expressly pointed out that the end distance projection 16b could very well be wider towards the right than is illustrated, without this interfering with the inter-engagement with a neighboring covering element 2 to be discussed in more detail further below.

As regards the second profile 14b of FIG. 5, the two projections 16a and 16c and the recess 18c all have substantially the same width.

In the third profile 14c of FIG. 6, the projections 16b and 16c and the recess 18c are substantially of the same width; the recess 18a is substantially twice as wide as in FIG. 1. Here, too, the end distance projection 16b indeed could be wider towards the right without this interfering with the inter-engagement.

A comparison of FIGS. 4, 5, 6 directly reveals that the first profile 14a (of course upon rotation thereof by 180°) could be laid selectively adjacent an additional first profile 14a or a second profile 14b or a third profile 14c. The second profile 14b, too, can be laid selectively adjacent a first profile 14a, a second profile 14b and a third profile 14c. The third profile 14c also is adapted to be selectively laid adjacent a first profile 14a or a second profile 14b or a third profile 14c. This becomes clear also from the history of origin of profiles 14a, 14b, 14c since, as compared to the profile 14 of FIG. 1, projections have been cut off completely or in part, while however no essential changes have been made, with the exception of the retractions 30. It is recognizable furthermore that, with respect to the retractions 30 (in so far as they are not reduced in a small part by projections 16 of the neighboring covering element 2 engaging therein), there are left elongate openings in the covering of a plurality of adjacently laid covering elements 2. These openings represent efficient water passage openings through which water precipitated may flow off into the bed underneath the covering, so that it need not be discharged into a discharge channel system. The depth of the retractions 30 with respect to the neutral line 12 determine—in addition to the width of the retractions 30, though this cannot be chosen very freely—the percentage of the water passage openings in the total covering. The purpose of the described change from the profile 14 of FIG. 1 to the profiles of FIGS. 4 to 6 consisted in providing covering elements 2 which in the laid state form water penetration passages in the covering.

If a second profile 14b is laid in inter-engagement with a second profile 14b, an inter-engagement is established that provides for positive locking in just one of two possible directions. The same holds if a third profile 14c is laid in inter-engagement with a third profile 14c. However, if a first profile 14a is laid in inter-engagement with a first profile 14a, positive locking in the two directions possible is achieved (since projection 16c engages in recess 18a framed on both sides by projections). The same holds for inter-engagement between a first profile 14a and a second profile 14b as well as for inter-engagement between a first profile 14a and a third profile 14c. Also with inter-engagement of a second profile 14b and a third profile 14d, there is a positive locking effect achieved in the two directions possible, i.e. towards the left and towards the right in FIGS. 4, 5, 6. The result of this is that covering elements 2 having only second profiles 14b all around their circumference and covering elements 2 having only third profiles 14c all around their circumference are not particularly advantageous under the aspect of inter-engagement on each circumferential basic element side. However, this aspect is not of extremely large significance especially with angular covering elements 2 as shown in FIG. 1, since the overall configuration of the covering element 2 already results in effective mutual anchoring of the covering elements 2 in the covering.

Good inter-engagement and/or good anchoring due to the covering element configuration is advantageous not only for the laid state but also for holding together of covering elements manufactured together on a plate of the manufacturing machine, when these are machine-laid using a gripper.

It has already been pointed out hereinbefore that it is basically possible to make covering elements 2 for providing coverings with efficient water passage openings which, at the circumference thereof, have either only first profiles 14a or only second profiles 14b (better, however, with at least one exception) or only third profiles 14c (better, however, with at least one exception) or an arbitrary combination of profiles 14a, 14b, 14c.

Figure 7:
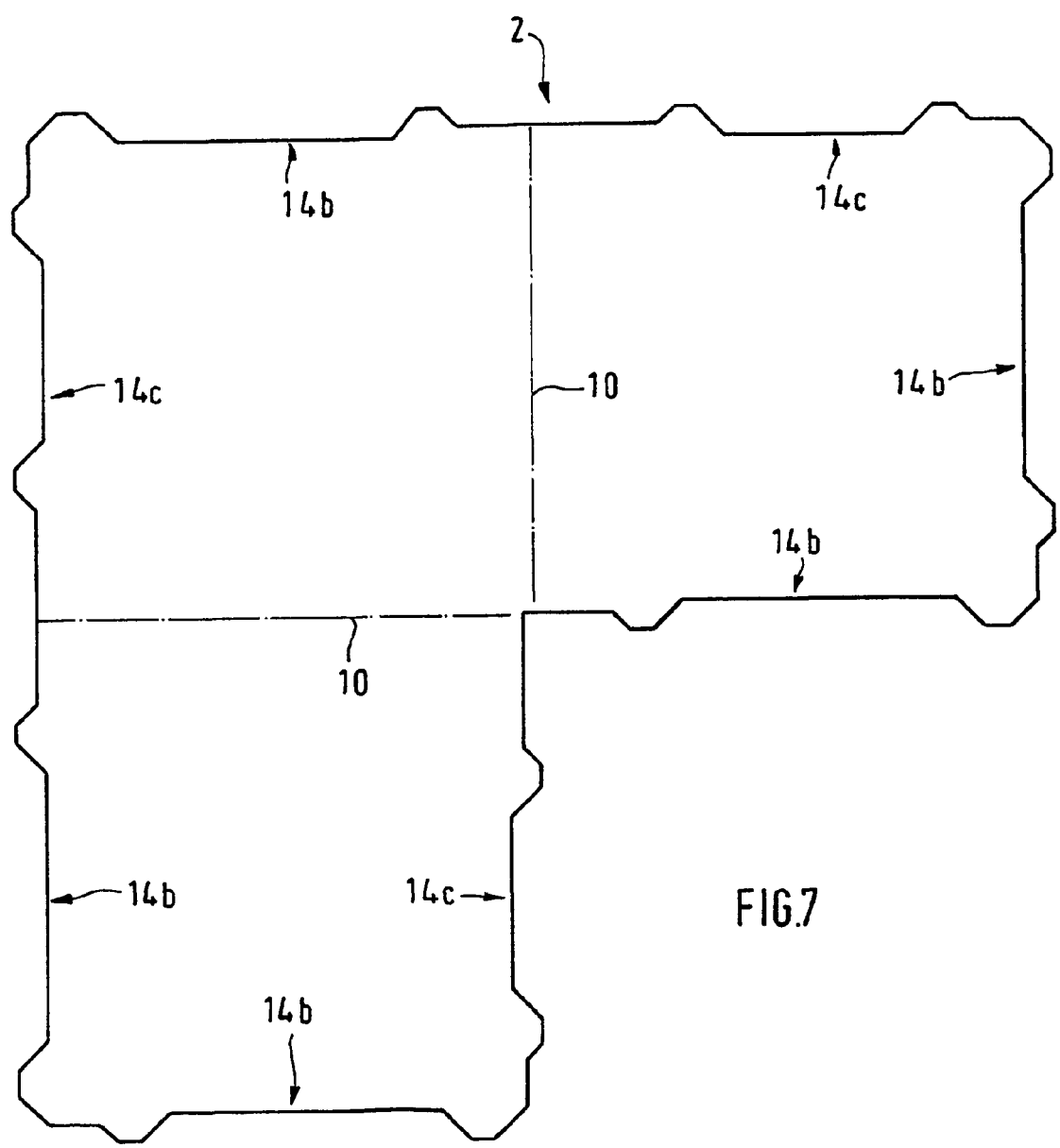
FIG. 7 shows an angular ground covering element according to a third embodiment.

FIG. 7 illustrates an embodiment of a water passage opening covering element 2 which has no first profile 14a, but five second profiles 14b and three third profiles 14c. As regards the locations of such second profiles 14b and such third profiles 14c, it is expressly referred to FIG. 7.

Figure 8:
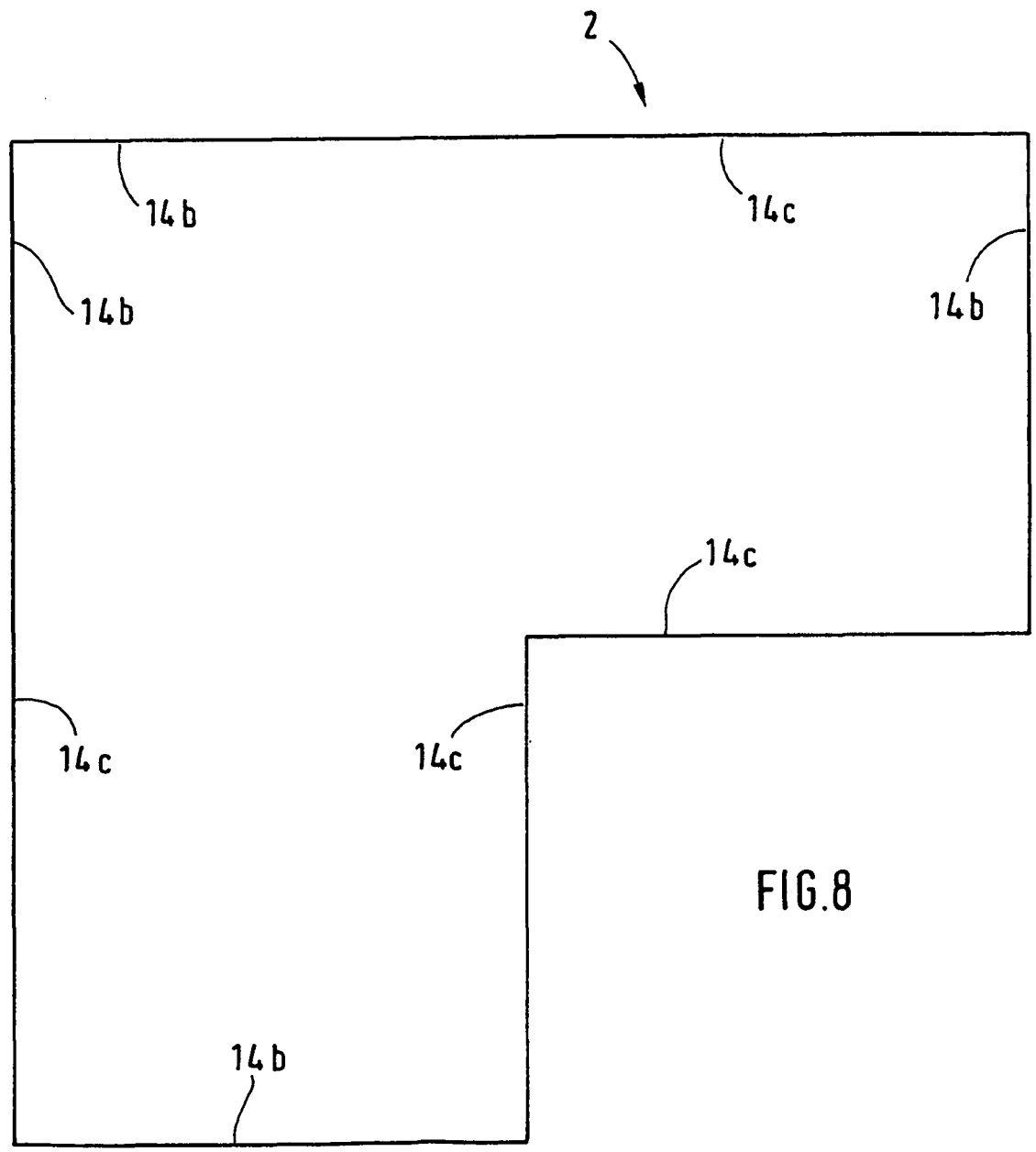
FIG. 8 shows a fourth embodiment of a ground covering element that is modified over that of FIG. 7, with partial regions being broken away.

FIG. 8 illustrates schematically (i.e. without explicit indication of the profiles) a modification in which four second profiles 14b and four third profiles 14c are provided, with these being distributed moreover in different manner along the circumferential basic element sides 12. As regards the distribution thereof over the circumferential basic element sides 12, it is expressly referred to FIG. 8.

Figure 9:
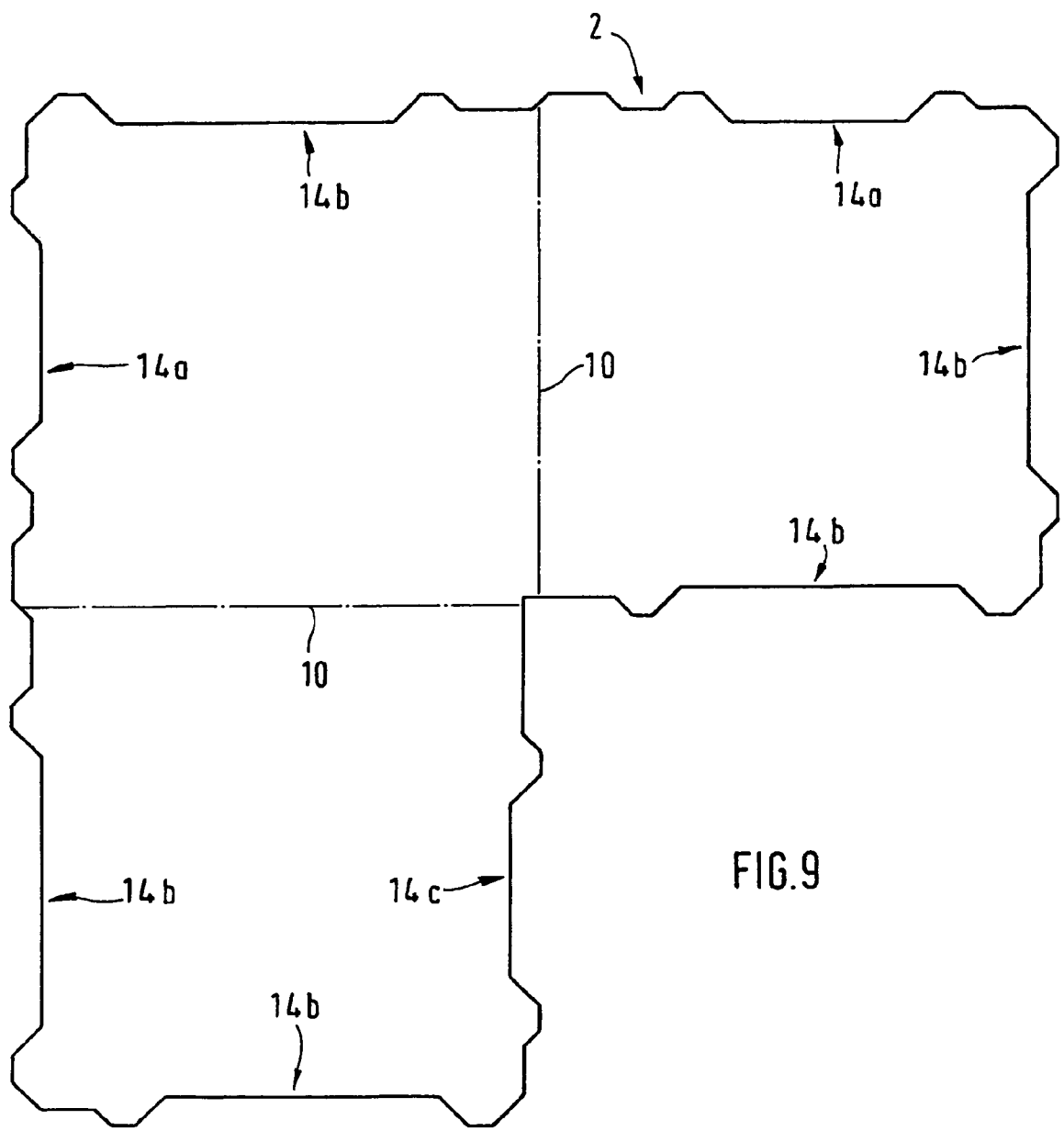
FIG. 9 shows an angular ground covering elements according to a fifth embodiment.

FIG. 9 shows an embodiment having two first profiles 14a, five second profiles 14b and a third profile 14c. As regards the individual circumferential basic element sides with the individual profiles, it is expressly referred to FIG. 9. The transition from the embodiment of FIG. 7 to the embodiment of FIG. 9 is conceivable such that two third profiles 14c have been replaced by two first profiles 14a.

Figure 10:
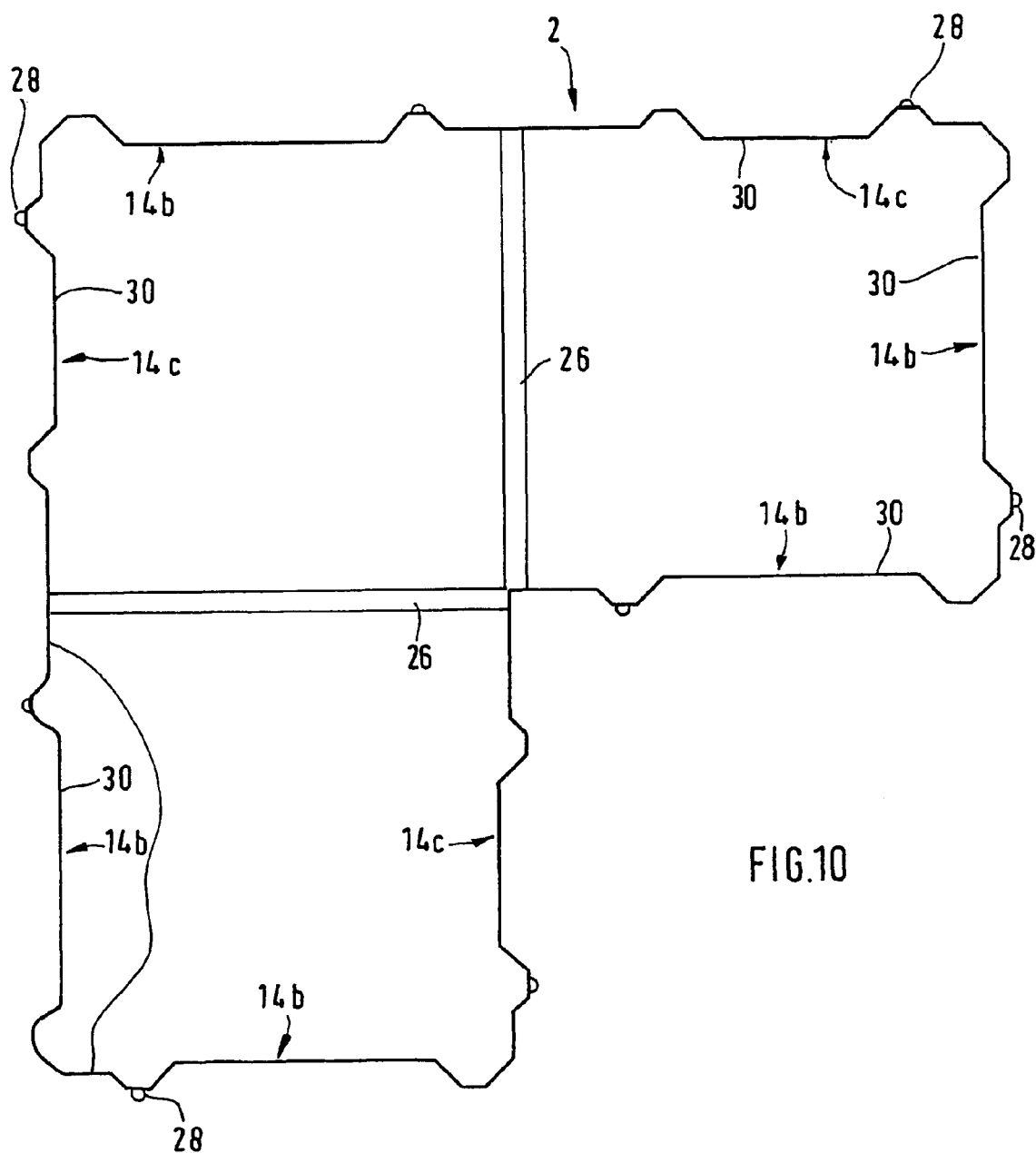
FIG. 10 shows a sixth embodiment of a ground covering element that is modified over that of FIG. 7.

Analogous with FIG. 3, FIG. 10 shows an embodiment in which the additional features "dummy gaps 26", "spacer projections 26" and "rounded projections 16" or "rounded recesses 18" or "rounded retraction 30", respectively, can be seen. Here too, the detailed statements made hereinbefore in relation to FIG. 3 hold in particular with respect to the non-existing cogent requirement of providing several of these features in combination.

We claim:

1. An angular ground covering element of artificial stone material having a periphery corresponding to a unification of several square basic elements, the ground covering element comprising projections and recesses around its circumference, retractions on the circumference for drainage of water, said projections and recesses are complementary in shape whereby projections on said element are capable of being received within recesses of an adjacently laid ground covering element, said retractions extend further into the ground covering element than the recesses;

said projections and recesses on each circumferential basic element side are defined by a profile, extending from a first end to a second end of the basic element side, said profile being chosen from the group of profiles consisting of:

(a) a first profile having a first end neighboring projection adjacent the first end of the basic element side, a second end neighboring projection adjacent the second end of the basic element side and a third projection there-between, said third projection being spaced from the ends, said retraction is positioned between said second projection and one of said first and third projections;

(b) a second profile having a first end neighboring projection adjacent the first end of the basic element side and a second end neighboring projection adjacent the second end of the basic element side, said retraction is positioned between said first and second projections; and (c) a third profile having a first projection spaced from said first and second ends and a second end neighboring projection adjacent the second end of the basic element side, said retraction is positioned between said first and second projections.

2. The ground covering element according to claim 1, characterized in that said projections and recesses have a trapezoidal profile.

3. The ground covering element according to claim 1, characterized in that said projections and recesses are confined by an at least partly rounded line.

4. The ground covering element according to claim 1, characterized in that said retractions have a trapezoidal profile.

5. The ground covering element according to claim 1, characterized in that the retractions are each confined by an at least partly rounded line.

6. The ground covering element according to claim 1, characterized in that the retraction is at least 33% of the width of the circumferential basic element said.

7. The ground covering element according to claim 1, further including spacer projections on its circumference.

8. The ground covering element according to claim 1, further including at least one dummy gap on its upper side, which generally extends along the junction line of the unification of two adjacent basic elements.

9. An angular ground covering element of artificial stone material having a periphery corresponding to a unification of several square basic elements, the ground covering element comprising projections and recesses around its circumference, and retractions on the circumference for drainage of water, said projections and recesses are complementary in shape whereby projections on said element are received within recesses of an adjacent element, said retractions extend further into the ground covering element than the recesses, said projections and recesses on at least one circumferential basic element side are defined by a profile, extending from a first end to a second end of the basic element side, said profile having a first end neighboring projection adjacent the first end of the basic element side, a second end neighboring projection adjacent the second end of the basic element side and a third projection there-between, said third projection being spaced from the ends, said retraction is positioned between said second projection and one of said first and third projections, the first end neighboring projection begins substantially at the first end of the basic element side, a first recess is provided adjacent to the second end neighboring projection, said first recess extending up to the second end of the basic element side, a second recess is provided between the third projection and one of the first and second end neighboring projections, and said first and second end neighboring projections and said first and second recesses have substantially the same width.

10. An angular ground covering element of artificial stone material having a periphery corresponding to a unification of several square basic elements, the ground covering element comprising projections and recesses around its circumference, and retractions on the circumference for drainage of water, said projections and recesses are complementary in shape whereby projections on said element are received within recesses of an adjacent element, said retractions extend further into the ground covering element than the recesses, said projections and recesses on at least one circumferential basic element side are defined by a profile, extending from a first end to a second end of the basic element side, said profile having a first end neighboring projection adjacent the first end of the basic element side and a second end neighboring projection adjacent the second end of the basic element side, said retraction is positioned between said first and second projections, said retraction is positioned between said first and second projections, the first end neighboring projection begins substantially at the first end of the basic element side, a recess is provided adjacent to the second end neighboring projection said recess extending up to the second end of the basic element side, and said first and second projections and said recess have substantially the same width.

11. An angular ground covering element of artificial stone material having a periphery corresponding to a unification of several square basic elements the ground covering element comprising projections and recesses around its circumference, and retractions on the circumference for drainage of water, said projections and recesses are complementary in shape whereby projections on said element are received within recesses of an adjacent element, said retractions extend further into the ground covering element than the recesses, said projections and recesses on at least one circumferential basic element side are defined by a profile, extending from a first end to a second end of the basic element side, said profile having a first projection spaced from said first and second ends and a second end neighboring projection adjacent the second end of the basic element side, said retraction is positioned between said first and second projections, a first recess is provided adjacent to the second end neighboring projection said first recess extending up to the second end of the basic element side, a second recess is provided adjacent to the first projection said second recess extending up to the first end of the basic element side, and said second end neighboring projection and said first recess have substantially the same width and said second recess has substantially twice the width with respect thereto.

* * * * *